March 28, 1961    G. L. BUTLER    2,977,166
SEALING RINGS
Filed Feb. 9, 1960

INVENTOR
Gray L. Butler
BY
H. F. Johnston
ATTORNEY

United States Patent Office 2,977,166
Patented Mar. 28, 1961

2,977,166

SEALING RINGS

Gray L. Butler, Terryville, Conn., assignor to Scovill Manufacturing Company, Waterbury, Conn., a corporation of Connecticut Filed Feb. 9, 1960, Ser. No. 7,644

6 Claims. (Cl. 309—4)

This invention relates to improvements in seals between relatively axially movable and/or rotatable parts wherein one part is made of a plastic material having some degree of flexibility.

In numerous devices associated with hydraulic mechanisms having relatively movable parts, it is essential that a fluid seal be effected between the movable parts. Heretofore, such seals have been provided by the use of a stuffing box, O-rings or other compressible elements between relatively movable surfaces and usually required various accessory rings or glands to hold the sealing element in place and in a compressed state.

It is the principal object of my invention to eliminate all extraneous compressible seals, holding rings and the like, and wherein at least one of the parts is made of a plastic material to construct said plastic part with integral flexible fins that are capable of effecting a fluid seal between the relatively movable surfaces of the interengaging members.

The above and other objects of the sealing means according to the present invention will appear from the following detailed description thereof taken with the accompanying drawings, in which.

In recent years, there has been a tendency to make many articles of plastic materials which heretofore were made of metal. Many mechanical devices are now being made from a combination of metal and plastic material and in some cases, entirely of plastic material. In various devices where fluid is employed, it is often necessary to effect a suitable fluid seal between the relatively movable parts. It is the purpose of this invention to provide a suitable seal that can be made as an integral part of the particullar member made of plastic material and in this particular disclosure it is the piston that is made of a hard pliable plastic material such as a linear polyethylene.

Figure 1:
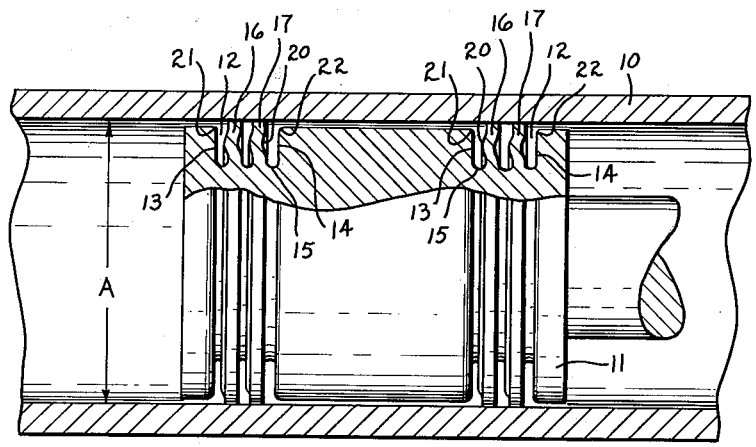
Fig. 1 is a sectional view through a mechanical structure having incorporated therein my improved sealing ring element.
Figure 2:
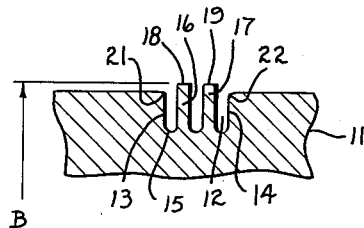
Fig. 2 is a sectional view of a portion of the movable member or piston showing particularly the integral rings as they appear before assembly into a cylindrical casing.

Referring now to the drawings in which like reference numerals designate like parts in the several views, in Fig. 1, there is illustrated a casing or cylindrical sleeve 10 within which is a reciprocal member or piston 11. As shown in Fig. 1, the piston 11 adjacent its opposte ends is formed with relatively wide and deep annular grooves 12 which provide opposite sidewalls 13 and 14 and a base 15. Formed integrally with and extending radially outwardly from the groove base 15 is a pair of relatively thin pliable fins 16 and 17 equally spaced from each other and from the groove sidewalls 13 and 14. As shown in Fig. 2, the fins 16 and 17 in their initial state are dimensioned to extend outwardly from the base of said groove a distance slightly beyond the exterior surface of the piston 11.

A typical example in which my invention was applied was in connection with garden hose nozzles having a movable member made of plastic material operating within a cylindrical sleeve of metal material that had an inner diameter as indicated by the dimension line A of approximately ½". The fins 16 ad 17 were spaced from each other and from the grooved sidewalls 13 and 14 in the order of about .020" and the wall thickness of each fin was about .020", this providing flat circumferential edges 18 and 19 for each fin. The outside diameter of the fins as represented by the dimensional line B in Fig. 2 before assembly with the piston, was in the order of about .004" greater than the inside diameter A of the sleeve 10. This is typical of one application and it should be understood that the above relative dimensions should be increased or decreased depending on the size of the structure to which the invention is applied.

Since the diameter of the fins 16 and 17 is slightly larger than the inside diameter of the sleeve 10 when the piston is assembled therein and the fins are at a normal position, i.e., perpendicular to the piston axis, the midportion will more or less buckle slightly as indicated at 20 in Fig. 1 and thus impart to said fins a radial tension serving to readily flip the fins into a biased position to one side or the other of their normal position depending on the direction of movement of the piston 11 to the sleeve 10.

Figure 3:
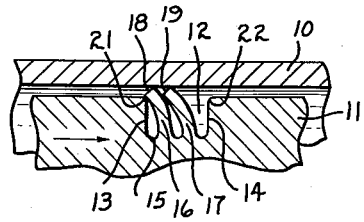
Fig. 3 is a fragmentary sectional view of the mechanical structure showing the rings in a lateral deflected state such as would occur when the piston is moved to the right.

When relative axial movement takes place between the sleeve 10 and the piston 11 as indicated by the arrow in Fig. 3, i.e., with the piston moving to the right and the sleeve stationary, the fins 16 and 17 will be biased to the left to a position where the free end of the fin 16 rests against the upper corner 21 of the wall 13 and the free end of fin 17 will rest against fin 16. The diameter of the fins, their thickness and the relative spacing of the fins to themselves and the groove sidewalls are such that when the fins are in a biased supported state as described above, said fins will still be in liquid sealing engagement with the inner surface of the sleeve 10.

Figure 4:
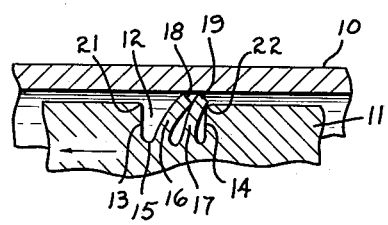
Fig. 4 is a similar view showing how the fins are deflected when the piston is moved to the left.

When the piston is moved in the opposite direction, i.e., to the left as shown by the arrow in Fig. 4, the fins will be flipped to the right and pass through the buckled state of Fig. 1. In this position, the free end of the fin 17 will rest against the upper corner 22 of wall 14 and the free end of fin 16 will rest against fin 17 with the periphery of the fins in sealing engagement with the sleeve 10.

In the drawing, I have shown two sets of sealing fin areas placed at opposite ends of the piston 11 for the purpose of better stabilizing the same. It is to be understood, however, that there may be applications where only one set of sealing fin areas may be required to obtain the desired sealing effect between the relative movable parts.

While in the drawing, I have shown a pair of fins employed in each set of sealing areas, it is obvious that more than two fins for each sealing area may be provided and so positioned that when the fins are biased, they will still support each other sufficiently to maintain their circumferential edges in liquid sealing engagement with the surrounding cylindrical wall.

It is also within the purview of this invention to form the sealing fins as an integral part of the inner wall of the cylinder 10, providing that part is made of a plastic material and using the finned cylinder with a piston in the form of an uninterrupted cylinder.

Various changes may be made in the details of construction without departing from the spirit and scope of the invention as defined by the following claims.

What I claim is:

1. A sealing means for two axially slidable members comprising a body having a cylindrical bore and a piston of relatively hard pliable plastic material loosely fitted within said bore, said piston having an exterior annular groove and a plurality of spaced relatively thin sealing fins formed as an integral part of said piston and extending laterally outwardly from the base of said groove, said fins having an outside diameter slightly larger than the inside diameter of said bore such that said fins will be biased out of a plane normal to the axis of said piston when the latter is moved axially relative to said body, said fins being spaced sufficiently close so as to lend support to each other when flexed out of their normal state upon relative axial movement of said piston to said body.

2. A sealing means for two axially slidable members comprising a body having a cylindrical bore and a piston of relatively hard pliable plastic material loosely fitted within said bore, said piston having an exterior annular groove providing a base and opposed sidewalls and a plurality of spaced relatively thin sealing fins formed as an integral part of said piston and extending laterally outwardly from the base of said groove, said fins having an outside diameter slightly larger than the inside diameter of said bore such that said fins will be biased out of a plane normal to the axis of said piston when the latter is moved axially relative to said body, said fins being so spaced from each other and from the opposed sidewalls of said groove as to lend support to each other when flexing out of their normal state upon relative axial movement of said piston to said body.

3. A sealing means as defined in claim 2 wherein the spaces between the fins and the fins and the sidewalls of said groove are substantially equal to the fin thickness.

4. A sealing means for use in first and second relatively movable members, the first member being a piston-like member made of a plastic material and movable in said second member in the form of a surrounding sleeve, said first member having an annular circumferential groove opening toward said sleeve and providing a base and opposed sidewalls, and a plurality of relatively thin flexible fins formed integral with the base of said groove and extending outwardly of said groove and beyond the diameter of said first member, the outside diameter of said fins being slightly greater than the inside diameter of said sleeve, said fins upon relative axial movement of said first and second members being laterally biased relative to each other and to the sidewalls of said groove and so positioned to lend support to each other for the purpse of holding the peripheral edges of said fins in liquid sealing engagement with the inner wall of said sleeve.

5. A sealing means for use in first and second relatively movable members, the first member being a piston-like member made of a plastic material and movable in said second member in the form of a surrounding sleeve, said first member having an annular circumferential groove opening toward said sleeve and providing a base and opposed sidewalls, and a plurality of relatively thin flexible fins formed integral with the base of said groove and extending outwardly of said groove and beyond the diameter of said first member, the outside diameter of said fins being slightly greater than the inside diameter of said sleeve, the spaces between said fins and the sidewalls of said groove being substantially the same as the thickness of said fins whereby said fins and sidewall will lend support to each other for holding the periphery of said fins in sealing engagement with said sleeve when the fins are in a biased state.

6. A sealing means for use with two axially relatively movable members, one within the other, one of said members having an annular circumferential groove in the wall that faces the other member and providing a base and opposed sidewalls, and a plurality of relatively thin flexible fins formed integrally with the base of said groove and extending outwardly of said grooves to a distance greater than the normal clearance space between said members, said fins being spaced relative to each other and to the sidewalls of said groove and of such thickness that said fins upon relative axial movement of said one member to said other member being laterally biased relative to each other and to the sidewalls of said groove and so positioned to lend support to each other for the purpose of holding the peripheral edges of said fins in liquid sealing engagement with the adjacent wall of said other member.

References Cited in the file of this patent

UNITED STATES PATENTS 2,886,034     Robinson et al. _____ May 12, 1959